US006267931B1

United States Patent
Nickens et al.

(10) Patent No.: US 6,267,931 B1
(45) Date of Patent: Jul. 31, 2001

(54) RECONFIGURABLE WASTE TREATMENT SYSTEM

(75) Inventors: Dan A. Nickens, Windermere; Charles C. Mattern, Clermonte, both of FL (US)

(73) Assignee: Earth Resources Corporation, Ocoee, FL (US)

( * ) Notice: Subject to any disclaimer, the term of this patent is extended or adjusted under 35 U.S.C. 154(b) by 0 days.

(21) Appl. No.: 08/190,929

(22) Filed: Feb. 3, 1994

(51) Int. Cl.[7] .......................... B01D 50/00; B01D 53/00
(52) U.S. Cl. ..................... 422/171; 422/168; 422/169; 422/170; 588/900; 137/597
(58) Field of Search .................. 422/168–170, 422/172, 173, 103, 171; 588/900, 261; 423/DIG. 5; 137/597, 884; 210/341, 259, 342, 253, 767, 284, 264, 322, 332, 143, 804, 806; 55/216, 223, 220, 233, 257.1, 228; 95/92; 261/DIG. 54; 110/215, 233, 234, 240, 257

(56) References Cited

U.S. PATENT DOCUMENTS

| | | |
|---|---|---|
| Re. 33,799 | 1/1992 | Gold ........................ 141/51 |
| 3,719,028 | 3/1973 | Brooks ..................... 422/168 |
| 3,870,474 | 3/1975 | Houston ................... 422/172 |
| 3,926,135 * | 12/1975 | De Gregorio ............ 137/255 |
| 3,929,411 | 12/1975 | Takano et al. ............ 137/572 |
| 4,038,032 | 7/1977 | Brewer et al. ............ 422/177 |
| 4,160,806 | 7/1979 | Long et al. ............... 422/223 |
| 4,168,243 * | 9/1979 | Zablin et al. ............... 588/6 |
| 4,208,383 | 6/1980 | Kisters et al. ........... 423/215.5 |
| 4,255,168 * | 3/1981 | Nguyen ............... 261/DIG. 54 |
| 4,411,846 * | 10/1983 | Ulrich et al. ............... 55/233 |
| 4,421,037 | 12/1983 | Leam ........................ 422/177 |
| 4,690,180 | 9/1987 | Gold ......................... 141/51 |
| 4,734,108 | 3/1988 | Cox et al. ................. 95/188 |
| 4,874,587 * | 10/1989 | Galloway .................. 588/900 |
| 4,875,420 | 10/1989 | Hay et al. ................. 110/215 |
| 4,944,333 | 7/1990 | Gold et al. ................ 141/51 |
| 5,186,219 | 2/1993 | Gold et al. ................ 141/51 |
| 5,269,352 | 12/1993 | Gold ......................... 141/51 |
| 5,279,646 * | 1/1994 | Schwab ............... 261/DIG. 54 |
| 5,383,499 * | 1/1995 | Mattern .................... 141/51 |

OTHER PUBLICATIONS

Alternative Technologies for the Destruction of Chemical Agents and Munitions, Comm. on Alternative Chem. Demilitarization Tech.; Bd. on Army Sci. and Tech.; Comm'n on Eng. and Tech. Sys.; National Research Council (National Academy Press, 1993).

Earth Resources Corporation; *Comprehensive Management of Compressed Gases*, (pamphlet).

Earth Resources Corporation; *Providing the Total Solution to Compressed Gas Problems with a Commitment to Safety & Quality*, (pamphlet).

Earth Resources Statement of Qualifications and Experience; Compressed Gas Management Services, (Statement of Qualifications).

* cited by examiner

*Primary Examiner*—Hien Tran
(74) *Attorney, Agent, or Firm*—Hunton and Williams

(57) ABSTRACT

A reconfigurable waste treatment system having one or more waste treatment units such as scrubbers, absorption units, and thermal destruction units, is provided for treating waste supplied to the treatment system from one or more waste sources. The treatment units are selectively connected between an output and an input of a distribution manifold. Each input may be selectively connected to a desired output to achieve a desired configuration of treatment units. A venturi vacuum pump and an inert gas supply are used to assist the evacuation of waste from the waste source. The inert gas can also be used to charge the system as a whole or selected treatment devices, when not in use, to prevent the accumulation of moisture therein. A flow/pressure regulator prevents the system from being overloaded. Holding vessels are provided for collecting waste to allow staged treatment and/or sampling. The system is enclosed in a containment chamber to prevent insufficiently treated waste from escaping into the environment. The chamber is provided with airtight hatches for entry and with a vent stack to exhaust sufficiently treated waste to the exterior of the chamber. The system may be operated remotely and may be placed on a transporter to provide mobile capability.

17 Claims, 5 Drawing Sheets

RECONFIGURABLE WASTE TREATMENT SYSTEM

BACKGROUND OF THE INVENTION

1. Field of the Invention

The invention relates generally to the field of waste treatment and more particularly, to a reconfigurable treatment system, particularly useful with a cylinder rupture vessel or other waste containing vessels.

2. Description of the Related Art

Hazardous waste can originate from a variety of sources and can take on numerous forms. Facilities that generate or collect waste from various sources can accumulate waste with widely-ranging characteristics. Typically, the waste is managed at the storage or accumulation point. This requirement, in view of the diversity of waste characteristics, presents problems in the effective stabilization, recontainerization, and treatment of the waste. Problems are particularly acute at abandoned waste sites where the nature of the waste may be unknown.

Many systems have been developed for treating hazardous waste, such that the byproducts after treatment are suitable for being returned to the environment or are otherwise safe for alternate methods of recontainerization or disposal. One common problem confronted in treating hazardous waste is that it is often enclosed in a container.

Devices for safely gaining access to the contents of containers enclosing potentially hazardous materials have been developed. Examples of such devices are disclosed in U.S. Pat. No. 4,690,180 (Reissue 33,797), U.S. Pat. Nos. 4,944,333, and 5,186,219, all assigned to Earth Resources Corporation. These devices are commonly referred to as cylinder rupture devices or CRVs. Once the contents of the cylinder or other container are accessed, they typically must be treated and/or recontainerized. Commonly, treatment is accomplished by transferring the contents to a treatment system for neutralization, dilution, thermal destruction, or other treatment depending on the nature of the contents. Such treatment procedures, in general, are well-known.

Systems have been developed for the treatment of specific hazardous waste streams. These systems are typically designed to allow effective management of specific materials and packaging schemes. Some conventional treatment systems have used a combination of scrubbers, adsorbents, burners, or other devices for treating waste. Use of these individual treatment units is generally known in the art. However, prior waste treatment systems which use a combination of these individual treatment units suffer various drawbacks. For example, for safety reasons, the treatment units are typically rigidly connected. Consequently, the path of waste through the units of the treatment system is normally fixed. This can result in inefficient and unnecessarily costly treatment of waste by requiring the waste to pass through all of the units in the system even though treatment by some units is not necessary for some applications. Additionally, the rigid connections make it difficult to change the order of the treatment units. Conventional treatment systems, therefore, fail to provide flexibility in adapting to different desired treatment configurations.

Previous waste treatment systems have typically been designed to meet various criteria of treatment efficiency. Permits may be obtained from regulatory agencies which allow discharge of waste within defined allowable limits. When used for a known, specific waste stream at a fixed location, the permits allow use of conventional treatment systems with known efficiencies. Typically, however, these systems are not adaptable to significant variations in waste characteristics. A change in waste parameters may cause the efficiency of the system to fall below permitted levels.

Regulatory agencies are generally reluctant to permit any discharge of waste in some areas, particularly where treatment efficiencies and discharge characteristics are not well-defined. Permitting agencies may prohibit any discharge from a treatment system until the discharge is characterized and shown to be within allowable standards.

Conventional waste treatment systems typically do not have containment devices necessary to increase the overall safety of the system. In a conventional system, if a component of the system fails, the waste is likely to escape into the surrounding environment. Especially with hazardous waste, this situation is undesirable.

A further problem with conventional waste treatment systems is that the system is typically designed for a fixed location and are not practically adaptable to the treatment of waste having widely varying characteristics depending on the particular site. Treatment systems are commonly designed with a large capacity for specific treatment needs. Once the treatment needs no longer exist, the system is typically dismantled. If the components are to be used in a system at another site they typically have to be transported and reassembled at the new location.

Also, while the use of burners, per se, in conjunction with waste treatment systems is well known, there are some problems with burners which are normally used. Typical burners rely on large quantities of air to provide sufficient oxygen for the thermal oxidizing and/or pyrolyzing process. Among other problems, this often causes the pressure within the system to rise above acceptable or desirable levels. Another problem that often results from using conventional burners is that undesirably high levels of exhaust often have to be contained within the system.

These specific problems are noted for example purposes only. It will be appreciated that there are other problems with the various conventional waste treatment systems.

SUMMARY OF THE INVENTION

It is an object of the present invention to overcome these and other drawbacks of the prior art.

Another object of the present invention is to provide a conveniently reconfigurable waste treatment system which enables waste to be directed to any combination of a plurality of treatment devices in any desired order. Additionally, the waste, if desired, may be selectively recirculated through the system until a desired sufficiency of treatment is attained.

It is a further object of the present invention to provide a novel scrubbing unit, burner, and venturi vacuum mechanism for use in a waste treatment system.

To accomplish various ones of these and other objects of the present invention, according to one embodiment, a waste treatment system is provided with a distribution mechanism which may comprise a manifold. The distribution mechanism preferably comprises a plurality of inputs and a plurality of outputs and is designed for receiving a waste product from a waste source and for selectively distributing the waste product to and from a plurality of treatment devices connected between the inputs and outputs of the distribution mechanism. Preferably, each treatment unit has an inlet and an outlet. Each outlet of a treatment unit is rigidly connected to an input of the distribution mechanism and each output of the distribution mechanism is rigidly connected to an inlet of a treatment unit. Within the distribution mechanism, a selected input may be connected to a selected output via a flexible connection, for example, a flexible stainless steel hose. Due to the high cost of flexible tubing, e.g., flexible stainless steel hose, which can safely be used in hazardous waste environments, this system helps minimize the need for relatively high-cost piping, yet permits relatively quick and easy reconfiguration of the order and/or components of the treatment system. The treatment units may comprise one or more of various units including scrubbing units, absorption units, thermal destruction units, and other desired treatment units. The waste treatment system may comprise any or all of these devices in any desired combination.

The flow path of the waste may be determined by either manually or remotely manipulating the connections of the distribution mechanism. The waste treatment system may be remotely monitored and operated.

The present invention can be used in conjunction with a mechanism for releasing the contents of a container within a contained environment. Such a mechanism might be used, for example, to puncture a gas cylinder within a contained environment. The gas may then be routed to the distribution mechanism. The waste product may be introduced into the waste treatment system from other sources including, but not limited to, a direct connection with a gas cylinder.

The waste treatment system may be made mobile by placing the entire system, or a part thereof, on or within a transportation device. The system is thereby made mobile and can be quickly and easily moved between waste treatment sites.

Treated and untreated waste may be collected by a receiving system. The waste product may be recycled through other components of the system before or after it has been collected in the receiving unit.

Further objects, features, and advantages of the present invention will be understood from the detailed description of the preferred embodiments of the present invention with reference to the appropriate figures.

BRIEF DESCRIPTION OF THE DRAWINGS

FIG. 2A is a front elevation of the burner unit. FIG. 2B is a cross-sectional view of the thermal destruction unit taken along line A—A of FIG. 2A.

DETAILED DESCRIPTION OF THE PREFERRED EMBODIMENTS

Figure 1:
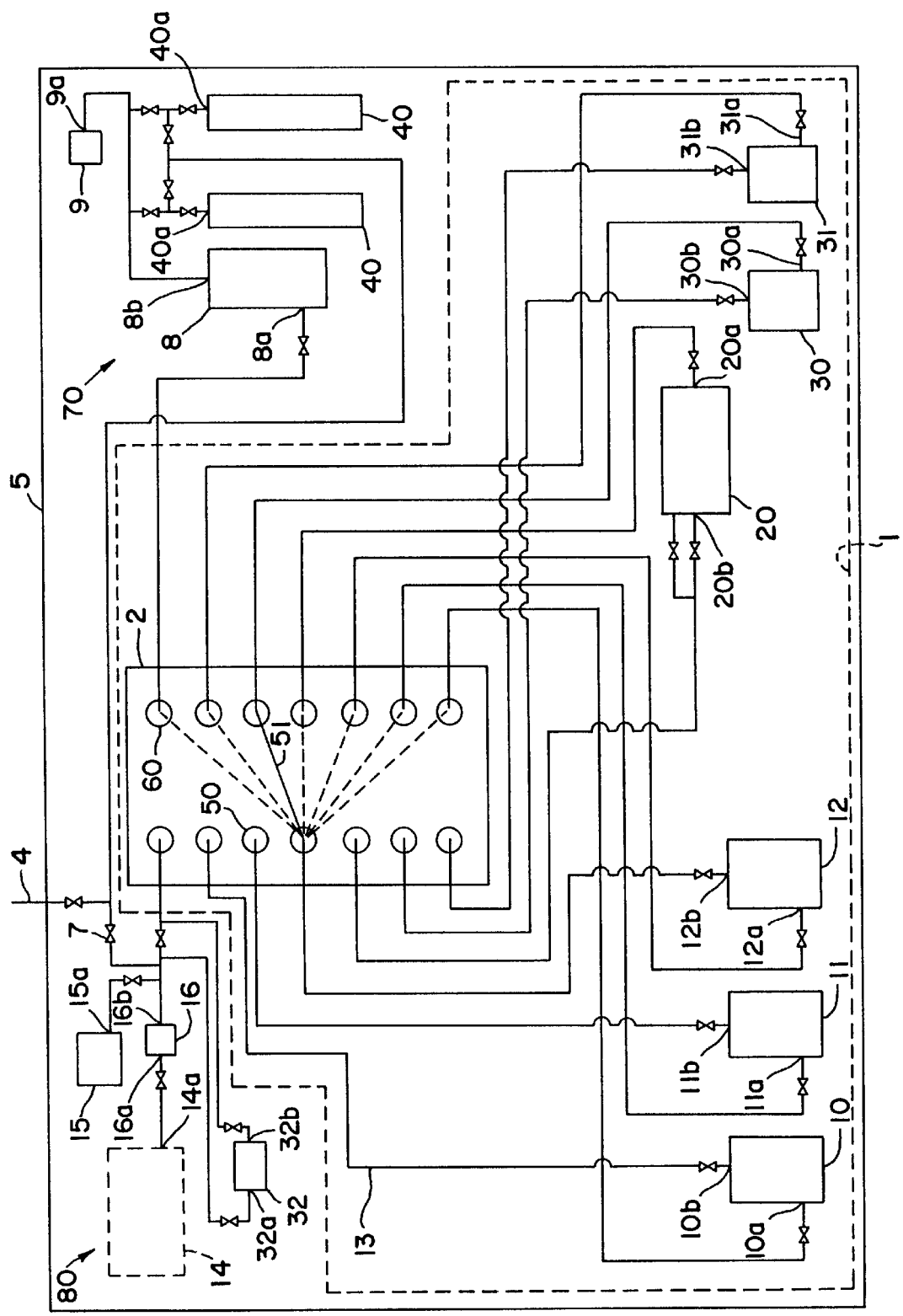
FIG. 1 is a schematic diagram of a waste treatment system according to a first embodiment of the present invention.

Referring to FIG. 1, a waste treatment system is provided according to an embodiment of the present invention. The waste treatment system, generally indicated by reference numeral 1, is preferably enclosed within a containment enclosure 5. For convenience, in FIG. 1, treatment system 1 is shown enclosed by a dotted line. Treatment system 1 preferably includes a distribution manifold 2 having a plurality of inputs 50 and a plurality of outputs 60, each of which is connected to one of a plurality of treatment units (e.g. 10, 11, 12, 20, 30, 31). One or more waste sources 14 is connected to the treatment system 1 (as further discussed below). Additionally, a waste introduction system 80 and a waste receiving system 70 may also be connected to the treatment system 1. Preferably, the treatment units, waste source(s), waste introduction system, and receiving system are located within the containment enclosure 5, but, in some instances, one or more of the units, sources, and/or systems may be externally located. Enclosure 5 is preferably airtight and preferably comprises steel plating of at least ¼" thickness or other suitable material. Containment enclosure 5 is preferably provided with an access door (not shown in FIG. 1), which should be capable of selectively maintaining the enclosure in an airtight state. For example, the access door may be similar to the hatches found on various ocean-going vessels.

Preferably, the inputs 50 and outputs 60 each comprise a rigid connector, for example, a stainless steel pipe. These rigid connectors are preferably welded or otherwise fixedly connected at one end to an outlet or inlet of a treatment unit or other device as described below. The other end of each rigid connector preferably extends to or into the distribution manifold 2. Within distribution manifold 2, each of the rigid input connectors may be selectively connected to a desired one of the rigid output connectors. Preferably, the connection is made via a flexible connector 51, which is made of a suitable flexible material, for example, a piece of flexible stainless steel hose. Alternately, each input 50 and output 60 may have a flexible connector 51 attached to its respective rigid connector. Selective connections between desired inputs 50 and outputs 60 can then be made be connecting the appropriate flexible connectors 51. Preferably, one or more of the inputs 50 is connected to one or more waste sources 14 through waste introduction system 80 and to receiving system 70. One or more of outputs 60 is also preferably connected to receiving system 70.

A typical connection using a flexible connector 51 is shown in FIG. 1. As shown, an input 50 is connected to outlet 12b of scrubber unit 12. Flexible connector 51 connects input 50 to an output 60, which is shown connected to inlet 30a of absorption unit 30. Dotted lines show that input 50 can be connected to any output 60. This arrangement is for illustration purposes only and the scope of the present invention is not so limited.

Enclosure 5 may be provided with a vent stack 4 selectively enables the distribution manifold 2 to be in communication with the exterior of enclosure 5. Vent stack 4 preferably comprises 1" diameter stainless steel pipe and a pipe valve 7 which is preferably a 1" pneumatically-actuated, ball-type valve of stainless steel and Teflon™ construction. However, other suitable material may be used for the pipe and other suitable valve assemblies may be used.

A purge source 15 is preferably provided for charging treatment system 1 with an inert gas. Preferably the inert gas is argon or nitrogen, but any inert gas may be used. Purge source 15 is connected to manifold 2, and thus to the various components of treatment system 1, through suitable pipes and fittings. When treatment system 1 is not treating a waste product, purge source 15 preferably maintains treatment system 1 under an ambient atmosphere of inert gas, thereby preventing atmospheric moisture from entering the system. When treatment system 1 is treating a waste product, purge source 15 is used as required to preferably maintain the non-selected treatment devices under an ambient atmosphere of inert gas. Ideally, all pipes, valves, and other components of treatment system 1 not incorporated into a given configuration will also be maintained under an ambient atmosphere of inert gas. As described below in greater detail, purge source 15 may also be used to assist in withdrawing the waste from source 14.

An in-line pressure/flow regulator 16 may be provided for regulating the flow of hazardous gas or waste from waste source 14 into system 1. An inlet 16a of regulator 16 is preferably in communication with waste source 14 through suitable pipes, fittings, and valves. Outlet 16b of regulator 16 connects regulator 16 with manifold 2 through suitable pipes and fittings.

A pump 8, preferably a venturi vacuum pump, may be provided for assisting in evacuating waste from waste source 14 and injecting the waste into system 1. Pump 8 has an inlet 8a and an outlet 8b and is preferably in communication with manifold 2 through suitable pipes, fittings, and valves. Venturi vacuum pumps, per se, are well-known.

Preferably, the outlet 8b of pump 8 is connected to one or more receiving vessels 40, each having an inlet/outlet 40a. Treatment system 1 is preferably connected to two receiving vessels 40, which receive treated and/or untreated waste, but any number of vessels, or no vessels, may be used. Each receiving vessel may be in selective communication with a sample port 9. Sample port 9 preferably has a valve and pressure gauge arrangement which allows a system operator to examine the waste product at any stage of treatment. Among other advantages, holding vessels 40 allow untreated, treated or partially treated waste to be collected, sampled and analyzed to determine whether further treatment is needed and, if needed, which type of treatment is desired. Treatment system 1 can thereby treat a waste product in stages, if desired. Further, any desired treatment efficiency may be obtained.

The treatment units may comprise a plurality of scrubber units 10, 11, 12 that are provided for scrubbing the waste product, e.g. hazardous gas. Scrubbing units generally are well-known in the art. Preferably, the scrubber units are each charged with a reagent or treating solution for neutralizing or otherwise treating the hazardous gas or other waste. In the arrangement provided in FIG. 1, the scrubbers may be charged with any of a number of solutions. For example, scrubber 10 may be charged with an alkaline or caustic solution, scrubber 11 may be charged with an acid reagent or solution, and scrubber 12 may be charged with an oxidizing solution. If the system has multiple scrubbing units, the treating solutions in any two of the scrubbing unit(s) may be the same or different. Venturi eductors may be utilized to mix the waste product with the treating solution. Scrubbers 10, 11, 12, are preferably designed to work over a range of pressures including relatively high pressures (e.g. on the order of 150 psig) and should be able to treat concentrations of waste gas up to 100%. Moreover, scrubbers 10, 11, 12 preferably comprise inlets 10a, 11a, 12a, respectively, near the bottom thereof. This placement of the inlet preferably allows the waste gas to be received by the scrubber underneath the reagent. Additionally, scrubber 10, 11, 12 are provided with outlets 10b, 11b, 12b, respectively, preferably located near the top of the scrubber units.

Each scrubber 10, 11, 12 preferably incorporates a liquid venturi (FIG. 5) capable of producing a vacuum on the order of 30 inches Hg absolute at the scrubber inlet 10a, 11a, 12a. The venturi allows the waste material to be introduced at or near the bottom of the scrubber. The venturi preferably facilitates mixing of the waste material with the reagent or treating solution of the scrubber. By offsetting the venturi from the center of the scrubber, a swirling motion of the waste/reagent mixture is preferably obtained, thereby increasing residence time and efficiency of treatment.

Figure 5:
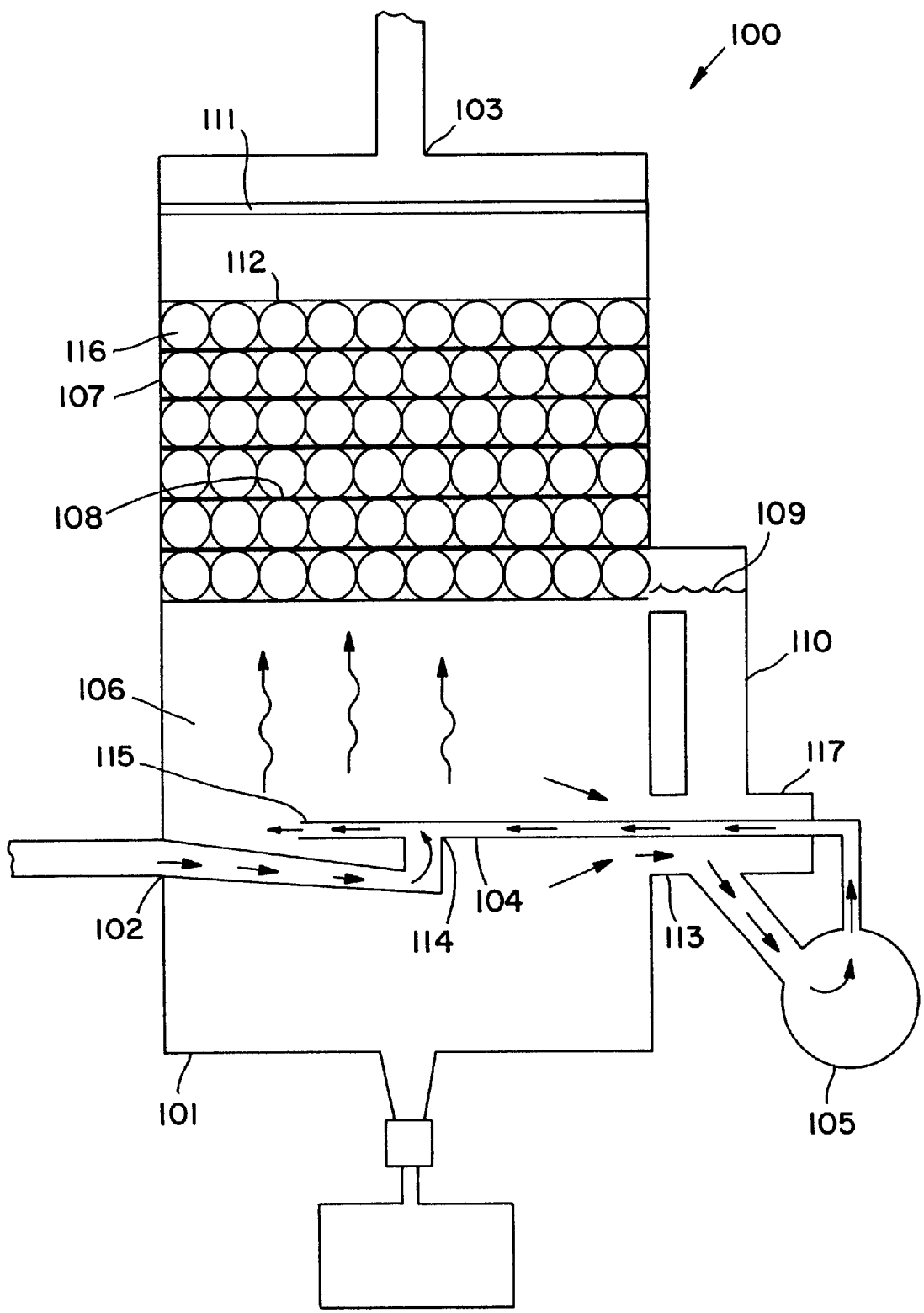
FIG. 5 is a detailed view of a typical scrubber unit used in the treatment system of FIG. 1.

Referring also to FIG. 5, for explanation purpose only, a typical scrubber 100 for use in the present invention is illustrated. Scrubber 100 has a housing 101 with an inlet 102 and an outlet 103, which correspond, for example, to inlet and outlet 10a, 10b of FIG. 1. Packing 107 is provided within housing 101 and comprises a plurality of baffle plates 108 and poul rings 116. A portion of the interior of housing 101 is filled with a reagent or treating solution, for example, reagent 106. Preferably, an upper level 109 of reagent 106 is at or below an upper level 112 of packing 107. Gauge 110 is provided in communication with the interior of housing 101 to assist in determining and maintaining the level of reagent within housing 101. A venturi 104 is positioned in a lower region of the interior of housing 101 below packing 107. Venturi 104 is in communication with a pump 105 through an inlet/outlet 113 and coupling portion 117. More than one pump together with more than one venturi may be used with each scrubber. Also, venturi 104 may be positioned partially or entirely within coupling portion 117. This may be desirable to, among other things, facilitate access to venturi 104. Venturi 104 is preferably of Teflon™ construction, but other materials may be used.

In operation, reagent 106 acts as the motive fluid for venturi 104, which mixes reagent 106 with waste introduced into scrubber 100 through inlet 102. Pump 105 draws reagent 106 through inlet/outlet 113 and forces reagent 106 through venturi 104. Arrows are provided in FIG. 5 to illustrate the flow path of reagent 106, the waste, and the waste/reagent mixture. As waste is introduced into the lower region of the interior of scrubber 100 through inlet 102, the vacuum created by venturi 104 draws the waste into a mixing area 114 where it is mixed with reagent 106. The waste/reagent mixture is then expelled from venturi 104 through outlet 115. Because venturi 104 is offset from the center of housing 101, a swirling motion is created and the waste/reagent mixture is further mixed, thereby allowing the waste to react with the reagent.

The waste then travels toward packing 107 where it encounters baffle plates 108, which, among other functions, break up large bubbles in the waste/reagent mixture to ensure that any remaining liquid entrained in the waste stream is removed. Poul rings 116 cooperate with baffle plates 108 to provide demisting of the waste stream. Waste exits the scrubber through outlet 103 and is directed to other components of system 1, for example, distribution manifold 2. Additionally, a demister 111 may be provided to prevent carryover of reagent 106 to other components of system 1, for example, when inert gas is allowed to travel through scrubber 100.

The remaining operation of the scrubber is well-known in the art and is therefore omitted from this description of the present invention. Referring again to FIG. 1, waste exits scrubbers 10, 11, 12 at outlets 10b, 11b, 12b, respectively.

The preferred arrangement of scrubbers is as described above. However, one of ordinary skill in the art will appreciate that different configurations with varying numbers and types of scrubbers may be effectively used in accordance with the embodiments of the present invention. Further, one will understand that the scrubbers may be omitted from system 1 entirely, if desired. Among other factors, the configuration selected will be determined by the type of waste product being treated.

Figure 2A:
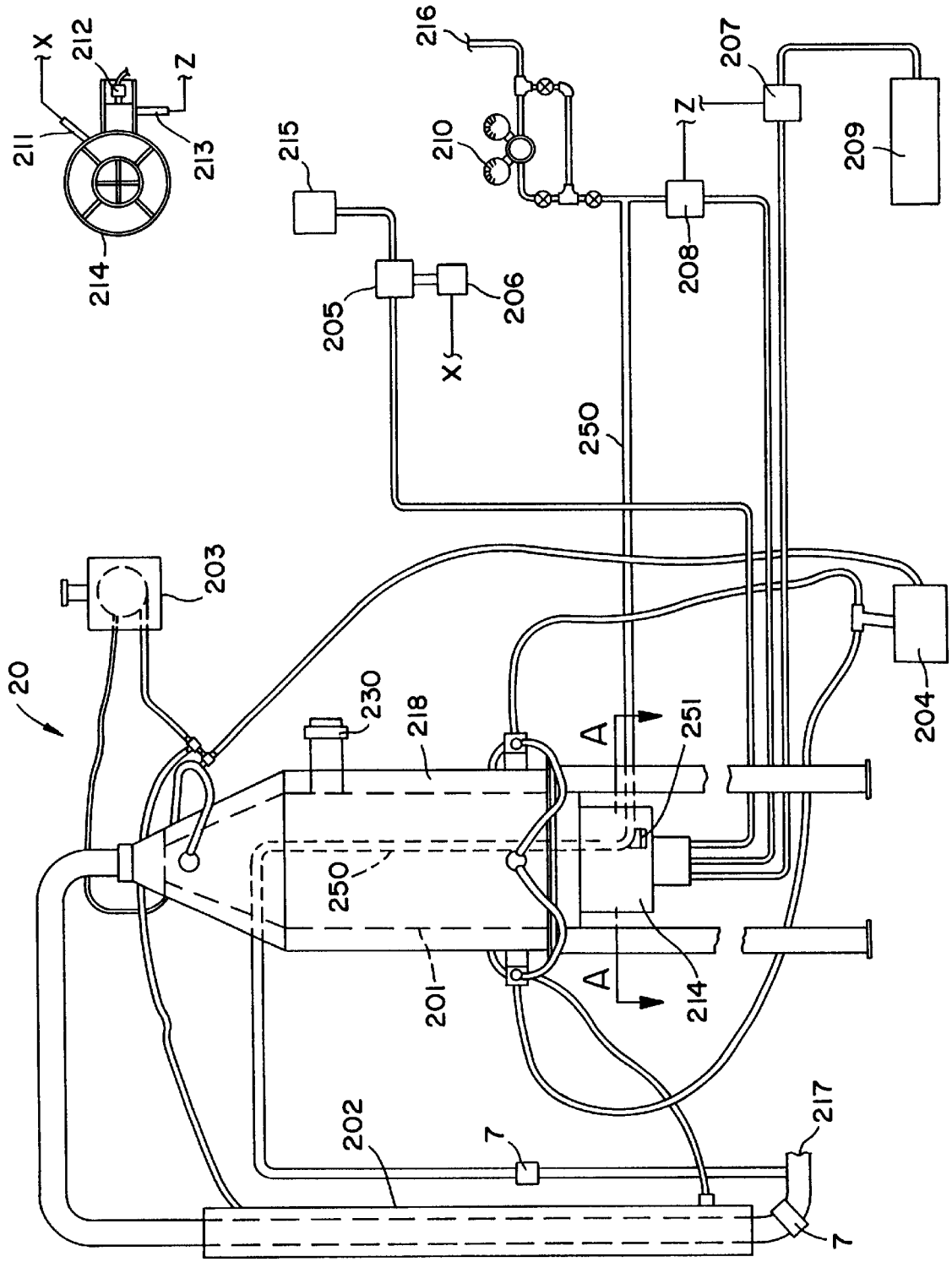
FIGS. 2A–2B depict a thermal destruction unit according to one embodiment of the present invention.

A thermal destruction unit 20 is provided for oxidizing and/or pyrolyzing waste gas routed to unit 20 from manifold 2. Preferably, unit 20 is enclosed within enclosure 5. Thermal destruction units are generally well-known in the art. For convenience, many of the known details of unit 20 are omitted from this description. As shown in FIG. 2A, unit 20 has a combustion chamber 201, which is supplied with propane from propane fuel source 209 and oxygen from oxygen source 215. Waste gas is introduced into chamber 201 through inlet 216 and can be regulated by flow regulator 210 to provide a uniform mixture of propane, oxygen, and waste gas. Inlet 216 is preferably connected to an output 60 of manifold 2 (not shown in FIG. 2A), as described above.

Figure 2B:
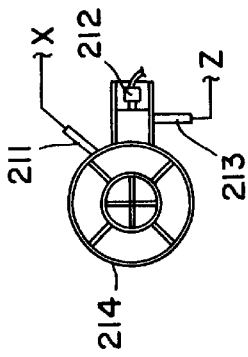

The gases enter a mixing manifold 214 and are ignited by an electronic ignition system 212 (FIG. 2B). Surfaces in the chamber 201, which are exposed to high temperatures, are cooled by a fluid that is circulated through a first heat exchanger 204 and a cooling jacket 218, which surrounds chamber 201. Exhaust gases from chamber 201 are cooled in a second heat exchanger 202 and are vented through outlet 217 to distribution manifold 2 (not shown in FIG. 2A). A reservoir 203 is provided to facilitate addition of coolant to the system.

System safety features include a flame detector 213 coupled with two solenoid valves 207, 208 for controlling the flow of propane fuel and waste gas, respectively. An oxygen sensor 211 provides feedback to a sensor relay 206, which operates an oxygen flow controller 205. The various sensing and controlling mechanisms provide optimum combustion conditions. Those having skill in the art will appreciate that optimum combustion conditions depend on several factors including, but not limited to, the chemical characteristics of the waste. Also, an optical port 230 may be provided for viewing an interior of chamber 201. Port 230 may house a flame detector (not shown) therein which is operatively communicated with chamber 230.

Unit 20 preferably minimizes the volume of gas used in the burning process by utilizing pure oxygen instead of air. Among other advantages, the minimization of gas used in the burning process preferably assists in maintaining acceptable pressure levels within system 1. Preferably, the controls described above provide a stoichiometric mixture of waste gas and oxygen to mixing manifold 214. Because the mixture of waste gas and oxygen is continuously monitored and maintained at an optimal level, treatment efficiency is optimized. Further, providing an optimal mixture minimizes the exhaust which is contained within system 1. Preferably, the exhaust produced by unit 20 consists of carbon dioxide or monoxide and water and should, therefore, be routed to scrubber unit 10, i.e., the caustic scrubber.

Although the preferred thermal destruction unit utilizes pure oxygen for the burning process, other units, including an air burning unit, may be employed. Further, in another embodiment of the present invention, unit 20 may be replaced by a unit (not shown), which uses plasma arc technology or a catalyst to achieve the required thermal destruction without an open flame.

Further, a pyrolysis unit, which is generally well-known, may be incorporated into the thermal destruction unit. The pyrolysis unit preferably has a ½" stainless steel process line 250, which allows waste to be directly routed through chamber 201 without mixing with propane and oxygen. Preferably, waste travelling through line 250 is contained within line 250 as the waste passes through chamber 201. Thereby, the waste in line 250 is indirectly subjected to heat in chamber 201 and is thus thermally decomposed. The waste then exits through outlet 217 to distribution manifold 2. Service port 251 is provided to allow access to a portion of line 250 which passes through chamber 201.

A plurality of absorption units 30, 31 are provided within enclosure 5 to further treat the waste product. Absorption units are well-known devices for treating waste products such as hazardous gas. Preferably, one absorption unit 30 contains activated carbon. Unit 31 preferably comprises a molecular sieve. Among other advantages, units 30, 31 preferably allow a gaseous waste product to be converted to a solid waste product which may be disposed by any suitable disposal method.

A typical pipe 13 is shown in FIG. 1 for connecting manifold 2 and scrubber 10. Pipe 13 is typical of the pipes used throughout system 1 for connecting the various components. Pipe 13 is preferably of stainless steel construction and rated for high-pressure use, e.g., on the order of 2000 psig. Pipe 13 preferably has a diameter on the order of about 1". Pipe 13 is preferably of uniform size throughout system 1. However, the size may vary. Any connections between pipe 13 and other pipes, treatment devices, valves, or other components, should be achieved by use of suitable joints rated for high pressure use, e.g., on the order of 2000 psig.

A typical valve 7 is shown in FIG. 1 disposed on vent stack 4 and is typical of the valves used throughout system 1. As described above in connection with vent stack 4, valve 7 is preferably a 1" pneumatically-actuated, ball-type valve of stainless steel and Teflon™ construction rated for high-pressure use, e.g., up to 2000 psig. It will be understood that the size of valve 7 will depend upon the size of pipe 13 selected for treatment system 1. Therefore, valve 7 may vary in size. Pipes 13, valves 7, and the remaining components of treatment system 1 should be connected so as to avoid low points which can trap liquid waste products.

Figure 4:
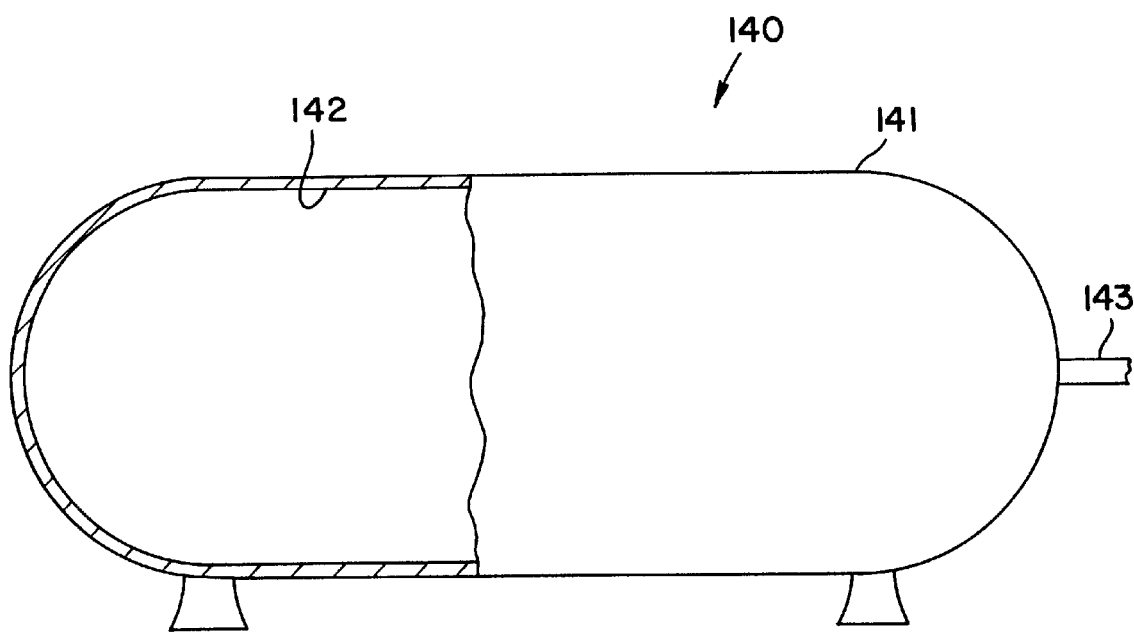
FIG. 4 depicts a waste source for supplying waste to be treated by the waste treatment system of FIG. 1.

The details of operation of treatment system 1 will now be discussed. Waste is introduced into treatment system 1 from one or more waste sources 14. Waste source 14 may comprise a cylinder rupture vessel (CRV) 140 as depicted in FIG. 4. CRV 140 has a housing 141 with a chamber 142 therein. A waste container (not shown), e.g. a hazardous gas tank, is ruptured within chamber 142 by a rupturing mechanism (also not shown). CRV 140 has an outlet 143 which is preferably connected to system 1. Although CRV 140 comprises the preferred waste source 14 for system 1, source 14 may be other sources of waste including, but not limited to, a hazardous gas cylinder itself, a direct connection to a process pipe, or other source. Moreover, more than one waste source may be connected to system 1.

Preferably, the waste flows from source 14, through waste introduction system 80, and into an input 50 of manifold 2. System 80 has a flow/pressure regulator 16 having inlet and outlet 16a, 16b, a purge source 15 having outlet 15a, and a mechanical vacuum unit 32 having inlet and outlet 32a, 32b. The waste flows through regulator 16, which, among other functions, preferably prevents system 1 from being overloaded. Waste source 14 may contain a waste product, e.g. hazardous gas, under pressure. Therefore, as waste is allowed into treatment system 1, the pressure at source 14 preferably decreases. Vacuum unit 32 is preferably capable of creating a vacuum of greater than 31 inches Hg absolute. Unit 32 is operable to evacuate source 14 of waste. Once the pressure at source 14 reaches a near-atmospheric level, pump 8 is operable to evacuate source 14 of remaining waste contained therein. Purge source 15 operates to introduce an inert gas into source 14. Preferably, the inert gas acts to "rinse" any remaining waste product from source 14. This procedure may be repeated, as desired, to more thoroughly evacuate the waste from source 14. In FIG. 1, purge source 15 is shown connected to the outlet side of flow/pressure regulator 16. Thus, for purge source 15 to introduce inert gas into waste source 14, regulator 16 is capable of two-way flow. Alternatively, purge source 15 could have a separate connection (not shown) to the inlet side of regulator 16.

The waste product is preferably directed to an input of manifold 2 through a pipe 13 and then to a predetermined output 60 a selectively-established connection using a flexible connector 51 as described above. Preferably, the waste is then routed to one or more treatment units depending on how the system is configured.

For example, the waste may pass from an output 60 to inlet 20a of thermal destruction unit 20, then from outlet 20b of unit 20 back through an input 50 of manifold 2. The waste may then pass through a flexible connector 51 to another output 60, which may be connected to inlet 10a of caustic scrubber 10. Then, the waste may be routed from outlet 10b to another input 50, which is, in turn, connected via another flexible connector 51 to another output 60. This output 60 may be connected to inlet 30a of absorption unit 30. Thereafter, the waste product, if sufficiently treated may be vented or recontainerized for off-site disposal or recycling.

In this example the waste product would flow through manifold 2, through thermal destruction unit 20, through manifold 2, through scrubber 10, through manifold 2, and into absorption unit 30. This example is provided for illustration purposes only, however, and should not be construed as limiting the scope of the present invention.

According to a feature of this embodiment, at any point in the flow path of the waste product, the waste may be routed through manifold 2 to receiving system 70. Preferably, the waste would be directed to one of the holding vessels 40 (optimally with the assistance of pump 8) to enable a system operator to analyze a sample of the waste via sample port 9.

If analysis of the waste indicates that predetermined or desired levels of treatment have be achieved, the waste may be vented or retained in vessel 40. Further, vessel 40 (or the waste) may then be removed and properly disposed of.

Alternately, if the analysis of the waste product dictates, the waste may be directed from vessel 40 to manifold 2 and exhausted to the exterior of enclosure 5 through vent stack 4. Moreover, it will be understood that the selective routing capability provided by manifold 2 would allow the waste to be exhausted to the exterior of enclosure 5 through vent stack 4 at any point during the treatment.

In another scenario, the analysis may dictate that the waste in vessel 40 has not been sufficiently treated. Thus, the waste may be routed back to manifold 2 to be recycled through system 1. According to this feature, if the analysis indicates that a different configuration of treatment devices is necessary, i.e., a different flow path, the connections, provided by flexible connectors 51, between inputs and outputs 50, 60 of manifold 2 may be rearranged to provide the desired configuration.

Figure 3:
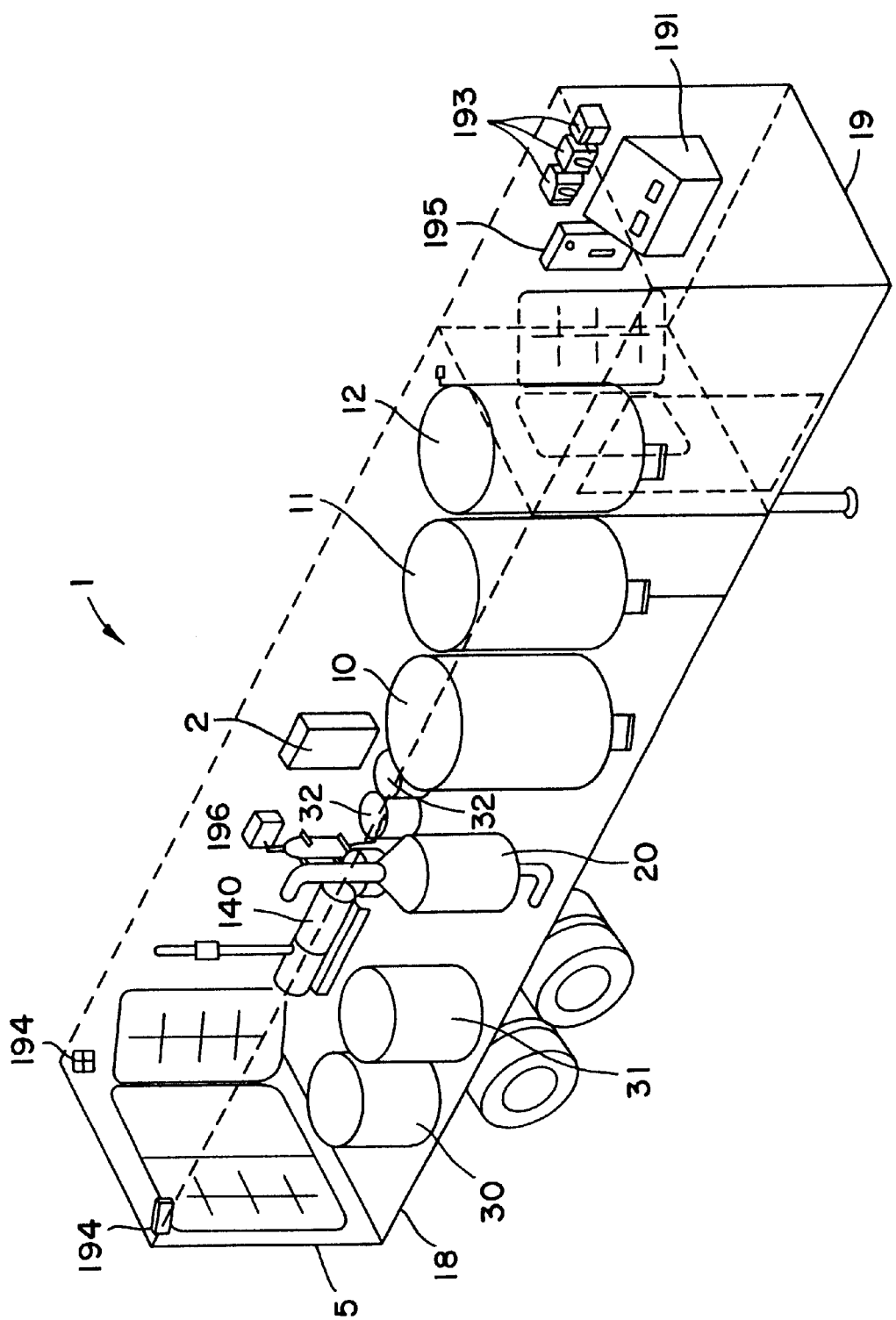
FIG. 3 is perspective view of a waste treatment system according to a second embodiment of the present invention.

Referring to FIG. 3, the waste treatment system 1 described may be mobile by placing enclosure 5 on a suitable transportation device including, but not limited to, a conventional truck-trailer rig. Trailer 18 of this type of rig is depicted in FIG. 3 with the various elements of system 1 contained therein. Trailer 18 itself may be constructed to serve as enclosure 5.

The embodiments described above may also have remote control capabilities. As best seen in FIG. 3, according to this feature, a remote room 19 is preferably located within the trailer 18. Remote room 19 is preferably exterior to, and may be adjacent to, airtight enclosure 5. Room 19 is preferably provided with a control panel 191 which may be capable of selectively and remotely connecting inputs and outputs 50,60 of distribution manifold 2. These connections may be achieved by any appropriate method, such as providing flexible connectors 51 with quick-disconnect-type fittings and providing hydraulic, electronically-actuated controls to receive electronic signals from control panel 191. These signals would preferably cause the hydraulic controls to connect and disconnect the fittings of connectors 51 as desired. Alternately, connectors 51 could all be preconnected through a system of electronically-actuated valves controlled by remote panel 191. In this embodiment, the valves could be opened or closed in the appropriate sequence to achieve the desired flow path.

According to another feature of the present invention, remote room 19 is preferably provided with remote viewing devices, such as closed-circuit monitors or T.V.s 193 linked to remote cameras 194 which are preferably positioned within enclosure 5. This feature allows remote viewing of the interior of enclosure 5 to provide added safety to the operation of system 1. Further, remote room 19 preferably houses a sampling panel 195, which is operatively linked to a remote valve actuation mechanism 196 positioned within enclosure 5. Mechanism 196 preferably permits a waste cylinder to be remotely sampled and identified. Mechanism 196 may also be used to provide remote actuation of cylinder valves when the contents of the waste cylinders are believed to be unstable or explosive or otherwise dangerous.

In another embodiment of the remote feature of system 1, the components of remote room 19 may be positioned apart from trailer 18. According to this embodiment, T.V.s 193, sampling panel 195, and control panel 191 are preferably linked to cameras 194, mechanism 196, and manifold 2, respectively by a conventional umbilical cord and relay-type arrangement (not shown).

Although several preferred embodiments of the present invention have been described in detail herein, the invention is not limited hereto. It will be appreciated by those having ordinary skill in the art that various modifications can be made without materially departing from the novel and advantageous teachings of the present invention. Accordingly, the embodiments disclosed herein are provided by way of example only. It is to be understood that the scope of the present invention is not to be limited thereby, but is to be determined by the claims which follow.

We claim:

1. A waste treatment system comprising:

a distribution manifold comprising a plurality of inputs and a plurality of outputs;

a plurality of waste treatment units, each having an inlet rigidly connected to at least one of said plurality of outputs of said distribution manifold and an outlet rigidly connected to at least one of said plurality of inputs of said distribution manifold;

at least one waste source connected to at least one of said plurality of inputs of said distribution manifold; and wherein said distribution manifold further comprises a plurality of flexible connectors, each of which is for connecting a selected one of said plurality of inputs of said distribution manifold to a selected one of said plurality of outputs of said distribution manifold to thereby enable a configuration of waste treatment units connected to said distribution manifold to be easily changed.

2. The waste treatment system of claim 1, wherein said waste source comprises a cylinder rupture vessel.

3. The waste treatment system of claim 1 further comprising a receiving system connected to at least one of said plurality of outputs of said distribution manifold.

4. The waste treatment system of claim 1, wherein said plurality of waste treatment units comprises at least one thermal destruction unit comprising a chamber adapted to thermally destroy a mixture of waste, oxygen and propane.

5. The waste treatment system of claim 1, wherein said plurality of waste treatment units comprises at least on thermal destruction unit comprising a chamber adapted to thermally decompose waste.

6. The waste treatment system of claim 1, wherein said plurality of waste treatment units comprises at least one scrubber unit comprising a housing, a venturi having an outlet disposed within said housing, and a pump in communication with said housing and operatively coupled to said venturi, wherein said venturi mixes a treating solution and a waste.

7. The waste treatment system of claim 6, wherein said at least one scrubber unit further comprises a plurality of baffles positioned between said inlet and said outlet of said at least one scrubber unit.

8. The waste treatment system of claim 7, wherein said at least one scrubber unit further comprises a demister positioned between said plurality of baffles and said outlet of said at least one scrubber unit.

9. The waste treatment system of claim 1, wherein said waste treatment units comprise at least one of a scrubber unit, a thermal destruction unit, and an absorption unit.

10. The waste treatment system of claim 1 further comprising a venturi vacuum pump connected to at least one of said outputs of said distribution manifold.

11. The waste treatment system of claim 1 further comprising a venturi vacuum pump connected to at least one of said outputs of said distribution manifold and connected to said at least one waste source.

12. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold;
at least one waste source connected to at least one of said plurality of inputs of said distribution manifold;
wherein said distribution manifold further comprises a plurality of flexible connectors, each of which is for connecting a selected one of said plurality of inputs of said distribution manifold to a selected one of said plurality of outputs of said distribution manifold to thereby enable a configuration of waste treatment units connected to said distribution manifold to be easily changed; and
sampling means operatively connected to at least one of said at least one waste source and said distribution manifold for sampling waste within the waste treatment system.

13. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold;
at least one waste source connected to at least one of said plurality of inputs of said distribution manifold;
wherein said distribution manifold further comprises a plurality of flexible connectors, each of which is for connecting a selected one of said plurality of inputs of said distribution manifold to a selected one of said plurality of outputs of said distribution manifold to thereby enable a configuration of waste treatment units connected to said distribution manifold to be easily changed; and
at least one holding vessel connected to said distribution manifold for holding waste received from said at least one waste source.

14. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold;
at least one waste source connected to at least one of said plurality of inputs of said distribution manifold;
wherein said distribution manifold further comprises a plurality of flexible connectors, each of which is for connecting a selected one of said plurality of inputs of said distribution manifold to a selected one of said plurality of outputs of said distribution manifold to thereby enable a configuration of waste treatment units connected to said distribution manifold to be easily changed; and
wherein each inlet of each treatment unit is fixedly connected to at least one of said plurality of outputs of said distribution manifold by rigid stainless steel pipe and wherein said flexible connector comprises flexible stainless steel hose.

15. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold;
at least one waste source connected to at least one of said plurality of inputs of said distribution manifold;
wherein said distribution manifold further comprises a plurality of flexible connectors, each of which [can connect] is for connecting a selected one of said plurality of inputs of said distribution manifold to a selected one of said plurality of outputs of said distribution manifold to thereby enable a configuration of waste treatment units connected to said distribution manifold to be easily changed; and
transporting means for transporting said distribution manifold and said plurality of waste treatment units.

16. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold; and
at least one waste source connected to at least one of said plurality of inputs of said distribution manifold.

17. A waste treatment system comprising:
a distribution manifold comprising a plurality of inputs and a plurality of outputs;
a plurality of waste treatment units, each having an inlet rigidly connected to at least one of said plurality of outputs of said distribution manifold and an outlet rigidly connected to at least one of said plurality of inputs of said distribution manifold; and
at least one waste source connected to at least one of said plurality of inputs of said distribution manifold,
wherein said distribution manifold further comprises a plurality of removable connectors, each of which is for connecting a selected one of said plurality of inputs of said distribution manifold to a selected one of said plurality of outputs of said distribution manifold to thereby enable a configuration of waste treatment units connected to said distribution manifold to be easily changed.

* * * * *